(12) United States Patent
Ma et al.

(10) Patent No.: US 11,839,793 B2
(45) Date of Patent: Dec. 12, 2023

(54) SIT-UP MOTION INFORMATION MANAGEMENT SYSTEM AND DETECTION METHOD BASED ON INTERNET OF THINGS

(71) Applicant: Lingnan Normal University, Zhanjiang (CN)

(72) Inventors: Xingzao Ma, Zhanjiang (CN); Yongzheng Yang, Zhanjiang (CN); Shiquan Sun, Zhanjiang (CN)

(73) Assignee: LINGNAN NORMAL UNIVERSITY, Zhanjiang (CN)

( * ) Notice: Subject to any disclaimer, the term of this patent is extended or adjusted under 35 U.S.C. 154(b) by 163 days.

(21) Appl. No.: 17/579,642

(22) Filed: Jan. 20, 2022

(65) Prior Publication Data

US 2022/0226694 A1    Jul. 21, 2022

(30) Foreign Application Priority Data

Jan. 20, 2021 (CN) .......................... 202110073048.5

(51) Int. Cl.
*A63B 23/02* (2006.01)
*A63B 24/00* (2006.01)
*A63B 71/06* (2006.01)

(52) U.S. Cl.
CPC ...... *A63B 23/0211* (2013.01); *A63B 24/0006* (2013.01); *A63B 24/0062* (2013.01); *A63B 71/0622* (2013.01); *A63B 2024/0009* (2013.01); *A63B 2024/0012* (2013.01); *A63B 2071/063* (2013.01); *A63B 2220/17* (2013.01);
(Continued)

(58) Field of Classification Search
CPC ............ A63B 23/0211; A63B 24/0006; A63B 24/0062; A63B 71/0622; A63B 2024/0009; A63B 2024/0012; A63B 2071/063; A63B 2220/17; A63B 2220/18; A63B 2220/803; A63B 2220/805; A63B 2230/62; A63B 71/0619; G06V 40/23
See application file for complete search history.

(56) References Cited

U.S. PATENT DOCUMENTS

| | | | | |
|---|---|---|---|---|
| 4,182,510 A | * | 1/1980 | Lundell | A63B 23/0211 482/140 |
| 4,509,748 A | * | 4/1985 | Bezak | A63B 23/0211 482/140 |
| 4,705,271 A | * | 11/1987 | Mondloch | A63B 21/4047 482/901 |

(Continued)

*Primary Examiner* — Garrett K Atkinson
(74) *Attorney, Agent, or Firm* — MH2 TECHNOLOGY LAW GROUP, LLP

(57) ABSTRACT

The present disclosure provides a sit-up motion information management system and detection method based on an Internet of things. The method includes: acquiring detection data of a sensor at present time; determining whether the detection data of the sensors at the present time meet a first counting condition, determining that a sit-up action is correct if yes, and incrementing a flag value by one; acquiring detection data of the sensors at next time; determining whether the detection data of the sensors at the next time meet a second counting condition, determining that a sit-up action is correct if yes, and incrementing a flag value by one; determining whether a flag value is greater than or equal to a preset value to obtain a third determination result; and determining, if the third determination result indicates yes, that one rep of sit-up actions is completed, and recording a number of sit-up reps.

20 Claims, 5 Drawing Sheets

(52) U.S. Cl.
CPC ..... *A63B 2220/18* (2013.01); *A63B 2220/803* (2013.01); *A63B 2220/805* (2013.01); *A63B 2230/62* (2013.01)

(56) References Cited

U.S. PATENT DOCUMENTS

| | | | | |
|---|---|---|---|---|
| 5,098,089 | A * | 3/1992 | Harrington | A63B 23/0211 482/145 |
| 5,300,004 | A * | 4/1994 | Muehlenbein | A63B 23/0211 482/142 |
| D349,316 | S * | 8/1994 | Miller | D21/686 |
| 5,417,636 | A * | 5/1995 | Havens | A63B 21/0552 482/145 |
| 8,016,726 | B2 * | 9/2011 | Abiemo | A63B 24/0062 482/145 |
| 2002/0132703 | A1 * | 9/2002 | Martinez | A63B 24/00 482/8 |
| 2007/0281840 | A1 * | 12/2007 | Tsai | A63B 23/0211 482/142 |
| 2009/0298657 | A1 * | 12/2009 | Potok | A63B 23/1245 482/141 |
| 2010/0197471 | A1 * | 8/2010 | Hayes | A63B 23/0211 482/142 |
| 2010/0255968 | A1 * | 10/2010 | Jiang | A63B 23/0211 482/140 |
| 2011/0269600 | A1 * | 11/2011 | Houle | A63B 69/0035 482/8 |
| 2014/0278229 | A1 * | 9/2014 | Hong | H04W 4/027 702/160 |
| 2016/0084869 | A1 * | 3/2016 | Yuen | G01P 3/44 73/510 |
| 2017/0086711 | A1 * | 3/2017 | Liao | A61B 5/1123 |

* cited by examiner

SIT-UP MOTION INFORMATION MANAGEMENT SYSTEM AND DETECTION METHOD BASED ON INTERNET OF THINGS

CROSS REFERENCE TO RELATED APPLICATION(S)

This patent application claims the benefit and priority of Chinese Patent Application No. 202110073048.5, filed on Jan. 20, 2021, the disclosure of which is incorporated by reference herein in its entirety as part of the present application.

TECHNICAL FIELD

The present disclosure relates to the technical field of sit-up detection, and in particular, to a sit-up motion information management system and detection method based on an Internet of things (IoT).

BACKGROUND ART

Existing products and disclosed patents mainly focus on counting systems (active infrared intrusion detectors), auxiliary devices and visual detection. Most products on markets count sit-ups by detecting distances between the head and the feet with infrared probes (photoelectric sensors). According to explanations from the Baidu Baike, the standard sit-up action is to lie on your back on a mat with knees bent in 90° and feet flat on the ground (for example, the ankles are pressed by hands of the companion), put hands on two sides of the body or cross the hands behind the head, lift the body up toward thighs with abdominal muscles, and lie down on the mat, and the motion is repeated. The counting methods with the infrared probes only determine that the head is lifted up, and cannot accurately determine whether the body is lifted up toward the thighs. Furthermore, the infrared probes are sensitive to light. When light intensities in environments vary a lot, measured distances of the infrared probes are greatly affected to make the counting standard unreliable. The counting devices using the visual detection are not cost-effective.

SUMMARY

An objective of the present disclosure is to provide a sit-up motion information management system and detection method based on an IoT, to obtain a higher counting accuracy in the sit-up detection.

To implement the above objectives, the present disclosure provides the following solutions.

A sit-up motion information management system based on an IoT includes: a main control chip, a laser distance sensor, a tilt sensor and a gesture recognition sensor, where the main control chip is respectively connected to the laser distance sensor, the tilt sensor and the gesture recognition sensor; and the laser distance sensor, the tilt sensor and the gesture recognition sensor are arranged on a thigh; the laser distance sensor is configured to detect a distance from the thigh to a trunk and send the distance to the main control chip; the tilt sensor is configured to detect an angle of the thigh from a horizontal ground and send the angle to the main control chip; the gesture recognition sensor is configured to detect an interference action of a hand and send the interference action to the main control chip; the main control chip is configured to determine present sit-up motion information according to the distance, the tilt angle and the interference action; and the present sit-up motion information includes a number of sit-ups and whether a sit-up action is standard.

Optionally, the sit-up motion information management system based on an IoT may further include: a server, where the server may be connected to the main control chip; the server may be configured to store preset sit-up motion information and receive the present sit-up motion information from the main control chip; and the main control chip may be configured to compare the preset sit-up motion information with the present sit-up motion information and determine whether the present sit-up motion information is the same as the preset sit-up motion information.

Optionally, the sit-up motion information management system based on an IoT may further include: a voice module, where the voice module may be connected to the main control chip; and the voice module may be configured to broadcast the present sit-up motion information determined by the main control chip.

Optionally, the sit-up motion information management system based on an IoT may further include: a terminal, where the terminal may be connected to the server; the terminal may be configured to send the preset sit-up motion information to the server; and the terminal may further be configured to receive the present sit-up motion information from the server.

A sit-up detection method based on an IoT is applied to the sit-up motion information management system based on an IoT in any of the above descriptions, and includes:

acquiring detection data of a sensor at present time, the detection data of the sensor at the present time including: a distance from a thigh to a trunk at the present time, an angle of the thigh from a horizontal ground at the present time and an interference action of a hand at the present time;

determining whether the detection data of the sensor at the present time meet a first counting condition to obtain a first determination result, where the counting condition includes that a distance from the thigh to the trunk at the present time is a first preset distance, an angle of the thigh from the horizontal ground at the present time is a first preset angle and an interference action of the hand at the present time is a first interference action;

determining, if the first determination result indicates yes, that a sit-up action is correct, and incrementing a flag value by one;

returning to the step of "acquiring detection data of a sensor at present time" if the first determination result indicates no;

acquiring detection data of the sensor at next time, the detection data of the sensor at the next time including: a distance from the thigh to the trunk at the next time, an angle of the thigh from the horizontal ground at the next time and an interference action of the hand at the next time;

determining whether the detection data of the sensor at the next time meet a second counting condition to obtain a second determination result, where the counting condition includes that a distance from the thigh to the trunk at the next time is a second preset distance, an angle of the thigh from the horizontal ground at the next time is the first preset angle and an interference action of the hand at the next time is the first interference action;

determining, if the second determination result indicates yes, that a sit-up action is correct, and incrementing a flag value by one;

returning to the step of "acquiring detection data of the sensor at next time" if the second determination result indicates no;

determining whether a flag value is greater than or equal to a preset value to obtain a third determination result; and determining, if the third determination result indicates yes, that one rep of sit-up actions is completed, and recording a number of sit-up reps.

Optionally, after the determining, if the third determination result indicates yes, that one rep of sit-up actions is completed, and recording a number of sit-up reps, the sit-up detection method may further include:

determining whether the number of sit-up reps reaches a preset number of reps to obtain a fourth determination result;

determining, if the fourth determination result indicates yes, that one set of sit-up motions is completed; and returning to the step of "acquiring detection data of a sensor at present time" if the fourth determination result indicates no.

Optionally, after the determining, if the third determination result indicates yes, that one rep of sit-up actions is completed, and recording a number of sit-up reps, the sit-up detection method may further include:

sending the number of sit-up reps to a terminal.

Optionally, after the determining, if the third determination result indicates yes, that one rep of sit-up actions is completed, and recording a number of sit-up reps, the sit-up detection method may further include:

sending the number of sit-up reps to a voice module.

Optionally, after the acquiring detection data of a sensor at present time, the sit-up detection method may further include:

determining whether the detection data of the sensor at the present time meet a start condition to obtain a fifth determination result, where the start condition includes that a distance from the thigh to the trunk at the present time is a third preset distance, an angle of the thigh from the horizontal ground at the present time is the first preset angle and an interference action of the hand at the present time is the first interference action;

determining, if the fifth determination result indicates yes, whether the detection data of the sensor at the present time meet the first counting condition; and returning to the step of "acquiring detection data of a sensor at present time" if the fifth determination result indicates no.

Based on specific embodiments provided by the present disclosure, the present disclosure has the following technical effects:

The sit-up motion information management system and detection method based on an IoT provided by the present disclosure determine the sit-up action correctly through the cooperation between the laser distance sensor, the tilt sensor and the gesture recognition sensor. The present disclosure counts the correct action according to the data detected by the laser distance sensor, the tilt sensor and the gesture recognition sensor, with a higher counting accuracy in sit-up detection.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following descriptions show merely some embodiments of the present disclosure, and a person of ordinary skill in the art may still derive other accompanying drawings from these accompanying drawings without creative efforts.

DETAILED DESCRIPTION OF THE EMBODIMENTS

Figure 1:
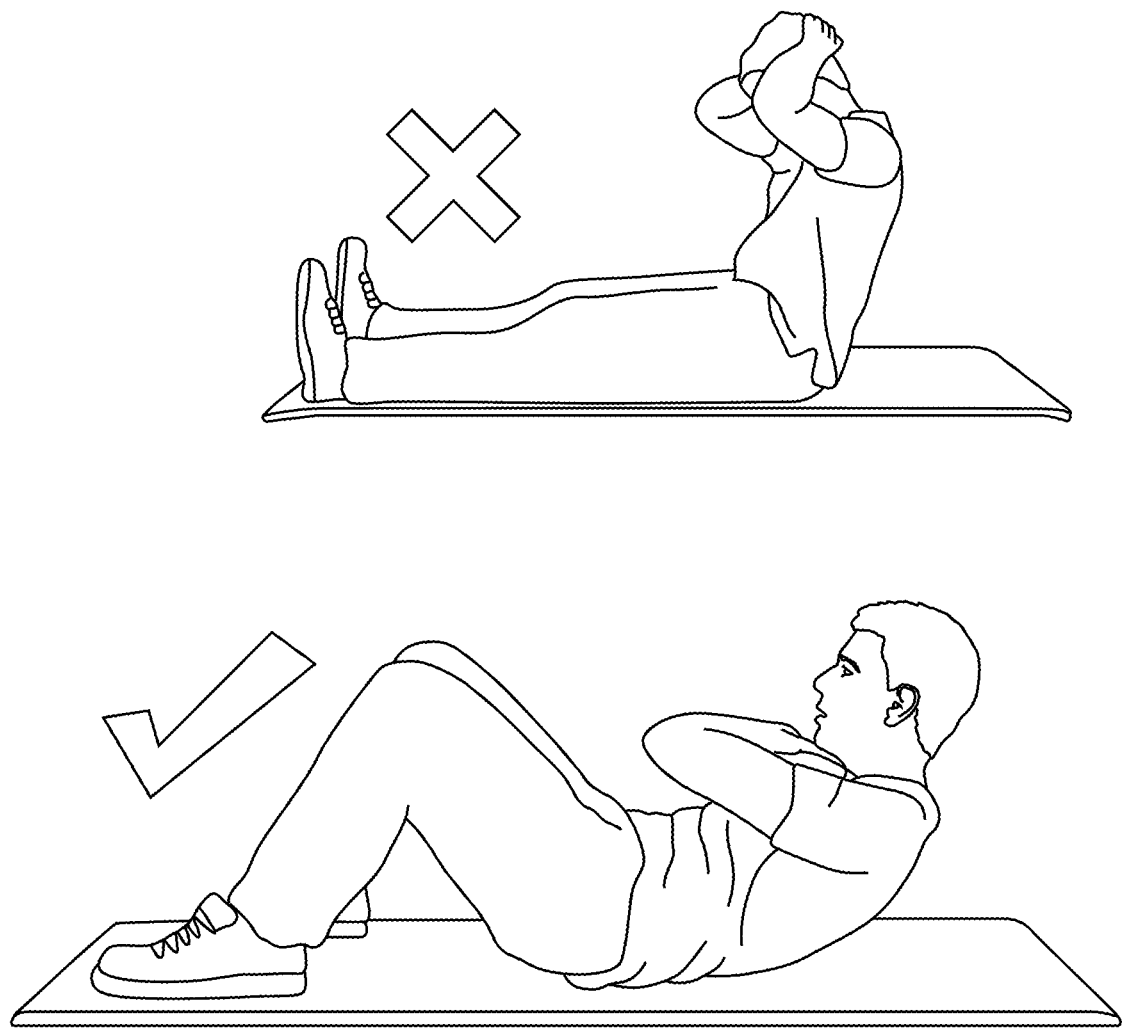
FIG. 1 illustrates a sit-up action.

The technical solutions in the embodiments of the present disclosure are clearly and completely described below with reference to the accompanying drawings in the embodiments of the present disclosure. Apparently, the described embodiments are merely a part rather than all of the embodiments of the present disclosure. Based on the embodiments of the present disclosure, all other embodiments obtained by the person of ordinary skill in the art without creative efforts shall fall within the protection scope of the present disclosure.

An objective of the present disclosure is to provide a sit-up motion information management system and detection method based on an IoT, to obtain a higher counting accuracy in the sit-up detection.

To make the above objectives, features, and advantages of the present disclosure clearer and more comprehensible, the present disclosure will be further described in detail below with reference to the accompanying drawings and the specific implementations.

Embodiment 1

The embodiment provides a sit-up motion information management system based on an IoT, including: a main control chip, a laser distance sensor, a tilt sensor and a gesture recognition sensor.

The main control chip is respectively connected to the laser distance sensor, the tilt sensor and the gesture recognition sensor; and the laser distance sensor, the tilt sensor and the gesture recognition sensor are arranged on a thigh; the laser distance sensor is configured to detect a distance from the thigh to a trunk and send the distance to the main control chip; the tilt sensor is configured to detect an angle of the thigh from a horizontal ground and send the angle to the main control chip; the gesture recognition sensor is configured to detect an interference action of a hand and send the interference action to the main control chip; the main control chip is configured to determine present sit-up motion information according to the distance, the tilt angle and the interference action; and the present sit-up motion information includes a number of sit-ups and whether a sit-up action is standard.

In actual applications, the sit-up motion information management system based on an IoT further includes: a server; the server is connected to the main control chip; the server is configured to store preset sit-up motion information and receive the present sit-up motion information from the main control chip; and the main control chip is configured to compare the preset sit-up motion information with the present sit-up motion information and determine whether the present sit-up motion information is the same as the preset sit-up motion information.

In actual applications, the sit-up motion information management system based on an IoT further includes: a voice module; the voice module is connected to the main control chip; and the voice module is configured to broadcast the present sit-up motion information determined by the main control chip.

In actual applications, the sit-up motion information management system based on an IoT further includes: a terminal; the terminal is connected to the server; the terminal is configured to send the preset sit-up motion information to the server; and the terminal is further configured to receive the present sit-up motion information from the server.

Embodiment 2

Figure 4:
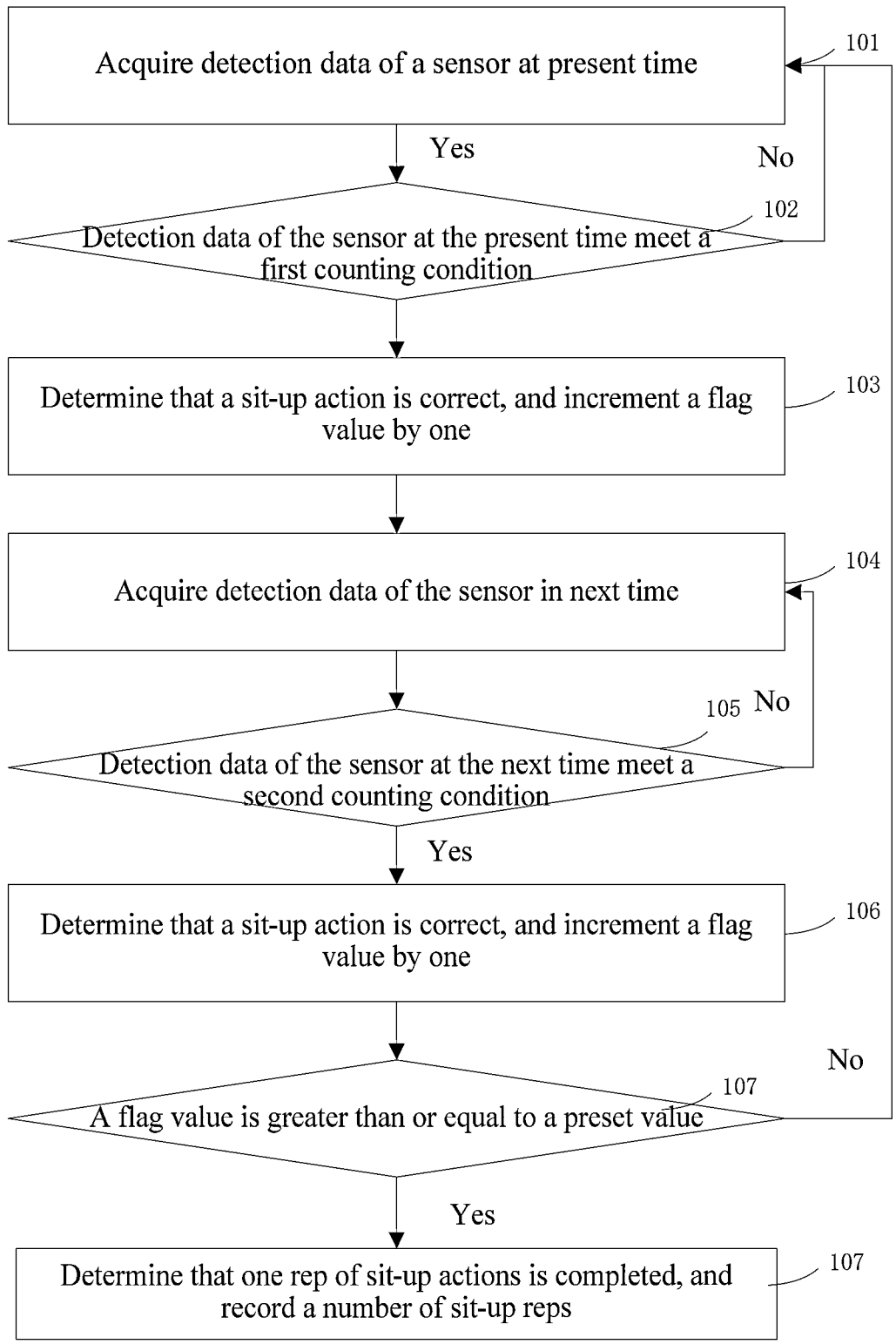
FIG. 4 illustrates a flow chart of a sit-up detection method based on an IoT according to Embodiment 3 of the present disclosure.

As shown in FIG. 4, the present disclosure further provides a sit-up detection method based on an IoT, which is applied to the sit-up motion information management system based on an IoT in Embodiment 1, and includes the following steps:

Step 101: Detection data of a sensor at present time are acquired, the detection data of the sensor at the present time including: a distance from a thigh to a trunk at the present time, an angle of the thigh from a horizontal ground at the present time and an interference action of a hand at the present time.

Step 102: Whether the detection data of the sensor at the present time meet a first counting condition is determined to obtain a first determination result, where the counting condition includes that a distance from the thigh to the trunk at the present time is a first preset distance, an angle of the thigh from the horizontal ground at the present time is a first preset angle and an interference action of the hand at the present time is a first interference action. If the first determination result indicates yes, Step 103 is executed; and if the first determination result indicates no, Step 101 is returned.

Step 103: It is determined that a sit-up action is correct, and a flag value is incremented by one.

Step 104: Detection data of the sensor at next time are acquired, the detection data of the sensor at the next time including: a distance from the thigh to the trunk at the next time, an angle of the thigh from the horizontal ground at the next time and an interference action of the hand at the next time.

Step 105: Whether the detection data of the sensor at the next time meet a second counting condition is determined to obtain a second determination result, where the counting condition includes that a distance from the thigh to the trunk at the next time is a second preset distance, an angle of the thigh from the horizontal ground at the next time is the first preset angle and an interference action of the hand at the next time is the first interference action. If the second determination result indicates yes, Step 106 is executed; and if the second determination result indicates no, Step 104 is returned.

Step 106: It is determined that a sit-up action is correct, and a flag value is incremented by one.

Step 107: Whether a flag value is greater than or equal to a preset value is determined to obtain a third determination result. If the third determination result indicates yes, Step 108 is executed; and if the third determination result indicates no, Step 101 is returned.

Step 108: It is determined that one rep of sit-up actions is completed, and a number of sit-up reps is recorded.

After determining, if the third determination result indicates yes, that one rep of sit-up actions is completed, and recording the number of sit-up reps, the sit-up detection method further includes:

Whether the number of sit-up reps reaches a preset number of reps is determined to obtain a fourth determination result. If the fourth determination result indicates yes, it is determined that one set of sit-up motions is completed; and if the fourth determination result indicates no, Step 101 is returned.

After determining, if the third determination result indicates yes, that one rep of sit-up actions is completed, and recording the number of sit-up reps, the sit-up detection method further includes:

The number of sit-up reps is sent to a terminal.

After determining, if the third determination result indicates yes, that one rep of sit-up actions is completed, and recording the number of sit-up reps, the sit-up detection method further includes:

The number of sit-up reps is sent to a voice module.

Optionally, after acquiring the detection data of the sensor at the present time, the sit-up detection method further includes:

Whether the detection data of the sensor at the present time meet a start condition is determined to obtain a fifth determination result, where the start condition includes that a distance from the thigh to the trunk at present time is a third preset distance, an angle of the thigh from the horizontal ground at the present time is the first preset angle and an interference action of the hand at the present time is the first interference action. If the fifth determination result indicates yes, whether the detection data of the sensor at the present time meet the first counting condition is determined. If the fifth determination result indicates no, the step of "acquiring detection data of a sensor at present time" is returned.

Embodiment 3

Figure 2:
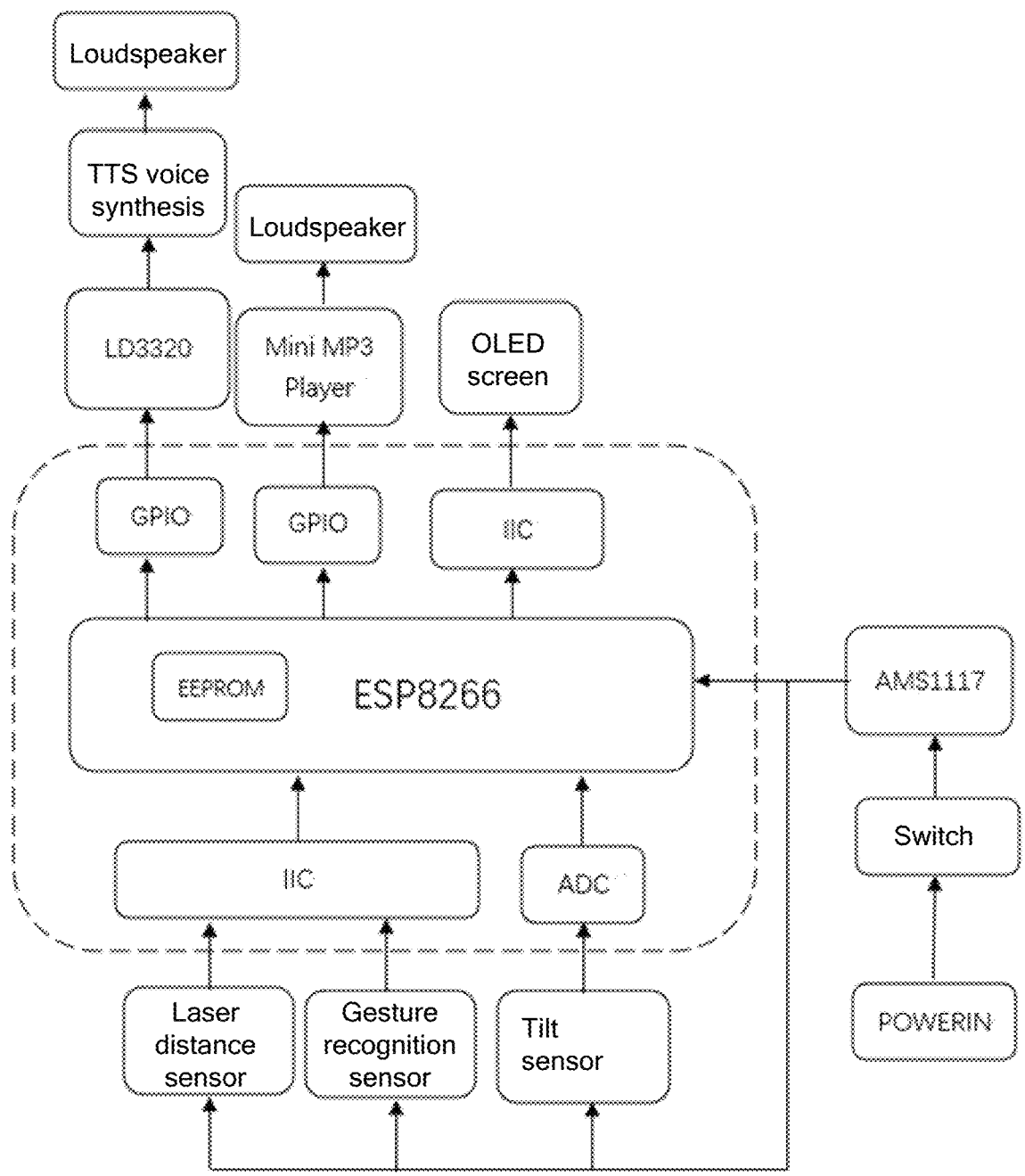
FIG. 2 illustrates a hardware structure of a sit-up motion information management system based on an IoT according to Embodiment 3 of the present disclosure.
Figure 3:
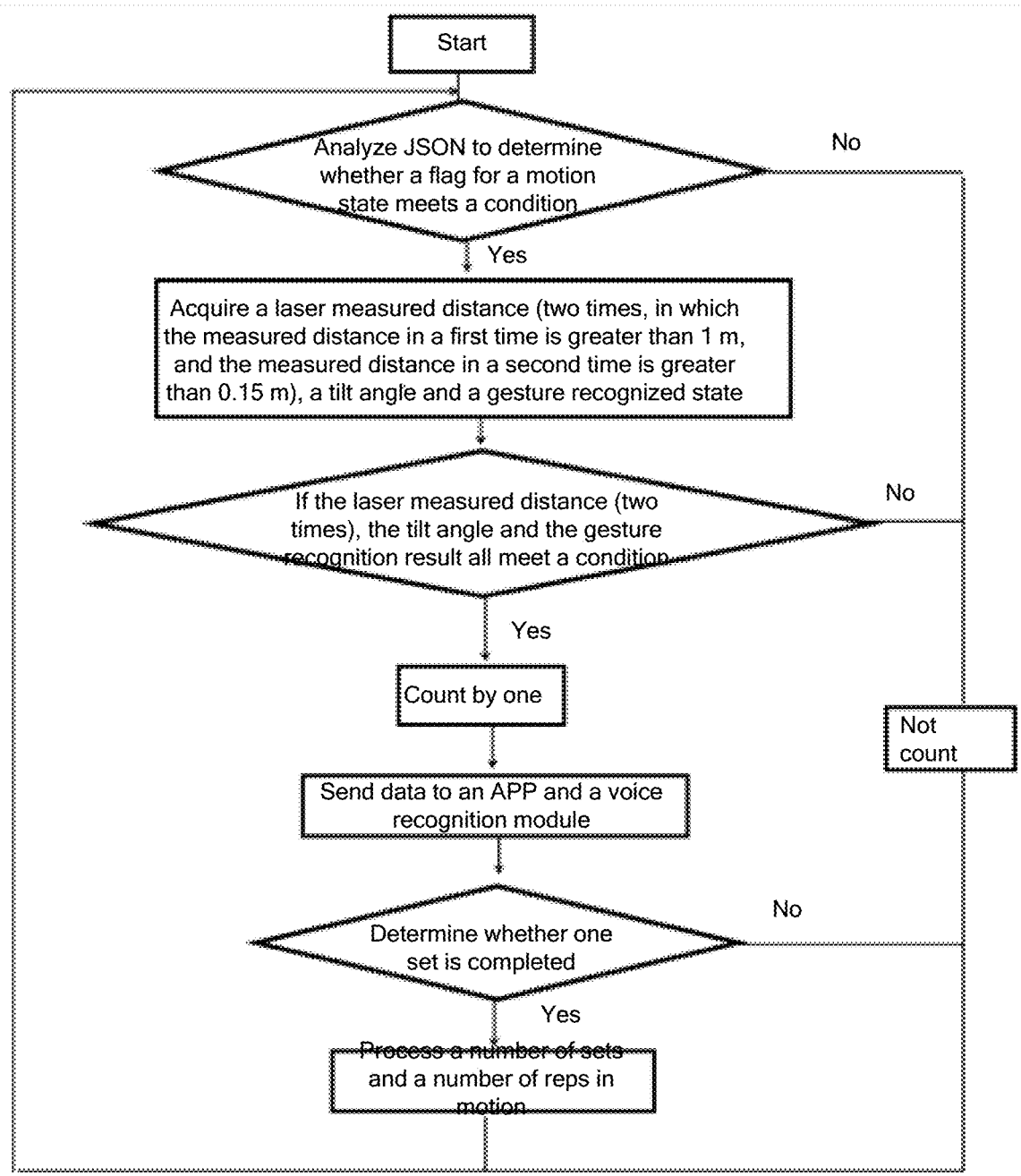
FIG. 3 illustrates a flow chart according to Embodiment 3 of the present disclosure.
Figure 6:
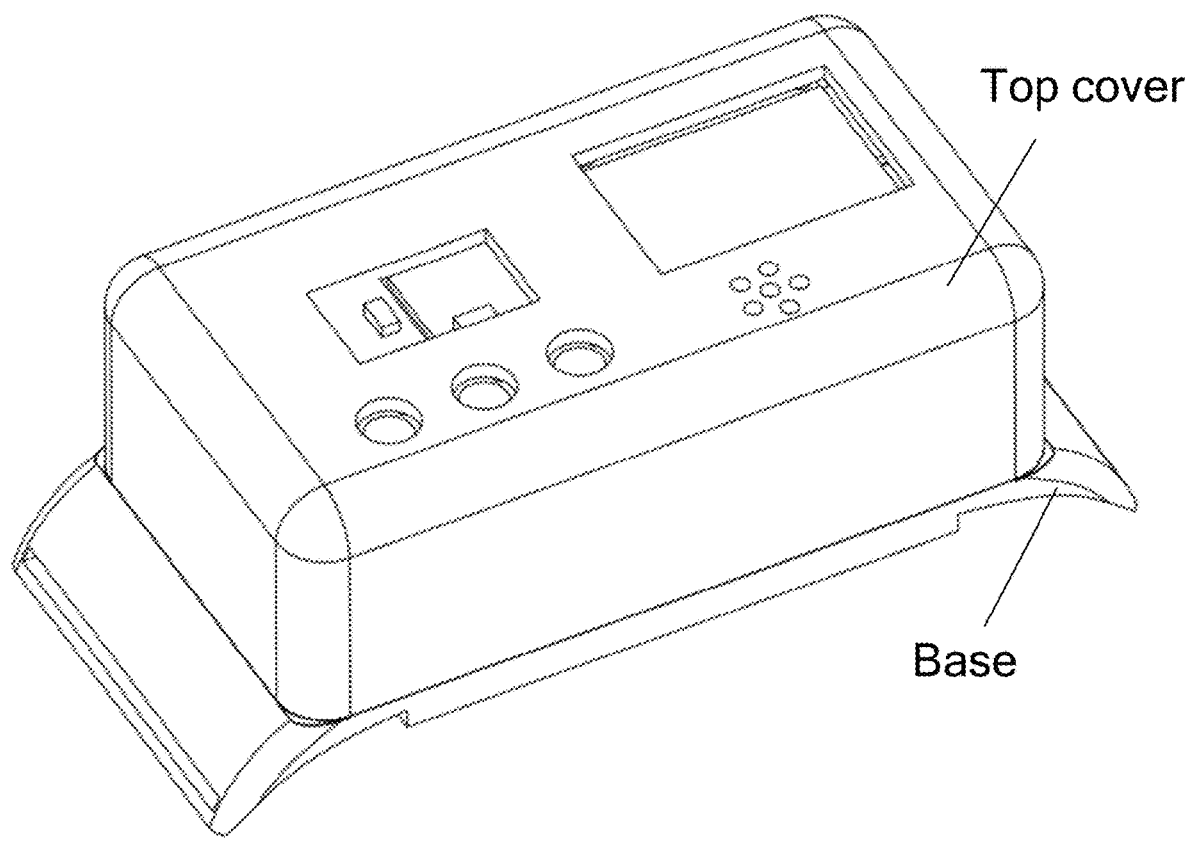
FIG. 6 illustrates an encapsulation housing of a device according to the present disclosure.

The embodiment provides a specific implementation for the sit-up motion information management system based on an IoT. The main control chip is a node microcontroller unit (NODEMCU) development board with the model of ESP8266. The model of the laser distance sensor is VL53L1X, the model of the tilt sensor is MMA7361, and the model of the gesture recognition sensor is PAJ7620U2. The voice module includes: a voice recognition module and a voice broadcast module. The model of the voice recognition module is LD3320, the model of the voice broadcast module is SYN6288, and the organic light emitting diode (OLED) display screen is the 1.3-inch inter-integrated circuit (IIC) OLED display screen. The NODEMCU development board as the main control chip is connected to the tilt sensor, the gesture recognition sensor, the voice broadcast module and the OLED display screen through an IIC communication protocol. The voice recognition module is connected to the voice broadcast module through serial communication. FIG. 1 illustrates a sit-up action. FIG. 2 illustrates a hardware structure in the embodiment. In actual applications, as shown in FIG. 6, all components are encapsulated in a housing, and the housing includes a top cover on a base. As shown in FIG. 3, the sit-up motion information management system based on an IoT has the following working process:

Step 1: Motion data are acquired.

The terminal APP sends present preset sit-up motion information to the server in a javascript object notation (JSON) data format, including a present motion mode (ordinary counting or timed counting), a number of sets, a number of reps in each set and flag information for starting the motion. After powered on, the NODEMCU development board is automatically connected to the wireless fidelity (WIFI) and the server in the present environment, and located in a wait state for acquiring JSON information. After the server sends JSON data to the NODEMCU, the NODEMCU detecting the JSON information returns received JSON data in a string format and stores the data as a variable. The NODEMCU analyzes the variable by calling an ArduinoJson library to obtain motion information and starts to work.

Step 2: Motions are counted.

Figure 5:
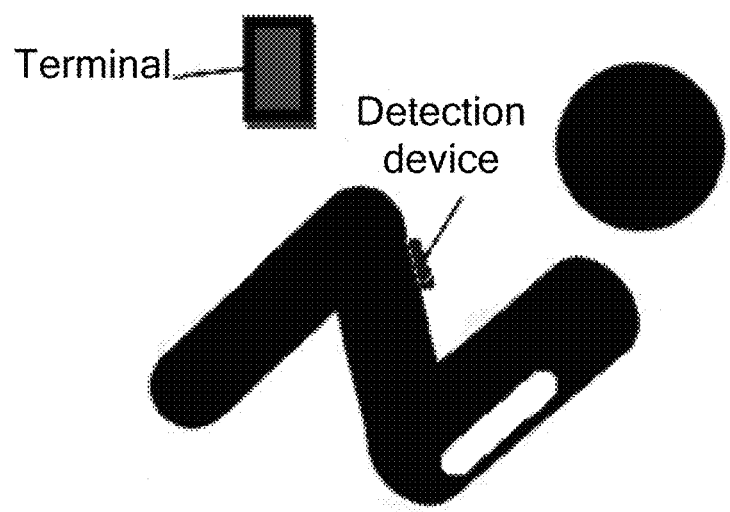
FIG. 5 illustrates a position for providing a device according to the present disclosure.

The motions are counted with the cooperation between the laser distance sensor, the tilt sensor and the gesture recognition sensor, to make user's actions standard. In actual use, as shown in FIG. 5, the laser distance sensor, the tilt sensor and the gesture recognition sensor are encapsulated in a device, and the device is tied on the thigh. When starting counting, the device acquires the laser measured distance, the tilt angle and the gesture recognized state. The laser distance sensor acquires a distance from the front object to the surface of the sensor, and sends the detected data to the NODEMCU through an IIC bus. The NODEMCU stores the data to the variable distance. The tilt sensor outputs an analog signal according to the present angle of the device from the horizontal ground. The NODEMUC acquires a change of the analog signal in value and stores it to the variable tilt angle. The gesture recognition sensor can recognize a clockwise/counterclockwise rotating direction of the finger, a moving direction of the finger and so on within an effective range, and feed recognized information back to the NODEMCU through the IIC bus. The NODEMCU reads gesture information from the sensor and stores it to the variable gesture.

At a start of the motion, the NODEMCU reads values of the variable distance, tilt angle and gesture. When the value fed back by the variable distance is 0-3,000, the mapping result indicates that the measured distance of the laser sensor is 0-3 m; when the value of the variable tilt angle is 400-500, the mapping result indicates that the present tilt angle of the device from the ground is 40-50°, the thigh of the user is bent and the action is standard. When the value fed back by the variable gesture is 0, there is no interference from other actions except the forward motion at present.

The NODEMCU reads the flag value. When the value of the variable distance in the first time is greater than 1,000, the variable tilt angle falls within the interval of 500-4,000, and the value fed back by the variable gesture is 0, it is indicated that the present user lies down, with the thigh bent appropriately and no interference from other actions, and in this case, the flag value is automatically incremented by one. When the value of the variable distance in the second time is less than 150, the variable tilt angle falls within the interval of 500-4,000, and the value fed back by the variable gesture is 0, it is indicated that the present user lifts up the body toward the device, with the thigh bent appropriately and no interference from other actions, and the flag value is continuously and automatically incremented by one. When the system detects that the flag value is greater than or equal to 2, it is indicated that the user has completed one rep of standard sit-up actions and the motion counting result is incremented by one. After that, the system resets the flag value and starts cyclic counting for the next rep of sit-up actions.

Step 3: The NODEMCU sends data to the APP and the voice recognition module.

At the start of the motion, the NODEMCU receives the start flag for the motion from the server. The NODEMCU takes the flag as the start flag for counting the motion, calculates a difference between the present time and the start time whenever counting up the rep, and sends the data and the number of sets and reps completed at the present time to the server through a hyper text transfer protocol (HTTP) in the JSON data format for analysis. Meanwhile, the NODEMCU sends the data to the voice module through a serial port, such that the voice module can broadcast the present motion information when the user queries the motion information with the voice. The voice module includes an LD3320 chip and an MP3 player. In actual applications, there is further the OLED display screen through which the motion information is displayed.

Step 4: Motion sets and reps are processed.

Before the start of the motion, the NODUMCU receives information on the number of sets and reps from the server and stores the information as a variable. The count number is incremented by one whenever one sit-up rep is completed. The system compares whether the present number of motions is the same as the variable on the number of motion reps stored before the start of the motions. If yes, the system automatically enters a cyclic wait stage, makes the number of sets incremented by one, and no longer counts the rep, which indicates that one set of motions has been completed and the user takes a rest. In this case, the system cannot count a next set of motions until the server sends the JSON data for continuous motion to the NODEMCU. When the number of sets is the same as the variable on the number of sets received before the start of the motion, the system exits the motion counting state and the motion is ended.

In the present disclosure, there is mainly a small sit-up motion detection device worn on the leg of the user. The present disclosure acquires the motion information of the user such as actions and the number of motions through the laser distance sensor, the tilt sensor and the gesture recognition sensor on the device, and provides real-time motion information for the user through the OLED screen, thereby solving the nonstandard counting actions of similar devices on markets; and meanwhile, through the voice recognition and broadcast, the user can know the motion in real time. The motion can be controlled by the manual button or the APP (by setting the sets, the reps and the timed mode). The loudspeaker will provide a signal for the user whenever the motion is started or one set is completed or the motion is ended. The present disclosure is provided with the terminal APP that can be downloaded to the smartphone. In combination with the IoT, voice recognition and voice broadcast, the present disclosure achieves rich man-machine interaction and solves the problem of single man-machine interaction of the similar devices on the markets. Moreover, the present disclosure is suitable for general people for the low cost, and provides more comfortable experience for the user. The system is further provided with other modules for further extension, so as to meet different requirements of people. The sit-up motion information management system and detection method based on an IoT provided by the present disclosure have the following advantages:

1. The present disclosure correctly determines the user's action, specifically, the present disclosure determines whether the action is standard with the laser distance sensor (which accurately measures the distance from the thigh to the chest) and the tilt sensor (which counts the number when a certain tilt angle is met, and thus standardizes the action), does not count the nonstandard action, and makes the user's action standard.

2. With the real-time voice recognition and broadcast, the present disclosure makes the user know the motion in real time to achieve the man-machine interactive effect.

3. The present disclosure controls the start, continuation and end of the motion with the IoT-based mobile phone APP, such that the user can browse historical motion information, motion tips and scientific motion modes freely with the mobile phone to adjust the motion plan conveniently.

4. The system has a power-off protection function, and can control the counting by the manual button or by the APP; and through the APP, the system can set the number of sets and reps for motion or the timed motion.

5. The present disclosure controls the motion by the manual button or the APP (by setting the sets, reps and timed mode), and can record motion data of the user in real time through the IoT-based mobile phone APP, thus helping people formulate the scientific sit-up exercise method, and making more people achieve the convenient and efficient motion from intellectualization.

Each embodiment of this specification is described in a progressive manner, each embodiment focuses on the difference from other embodiments, and the same and similar parts between the embodiments may refer to each other.

Specific embodiments are used to expound the principle and implementations of the present disclosure. The description of these embodiments is merely used to assist in understanding the method of the present disclosure and its core conception. In addition, those of ordinary skill in the art can make modifications in terms of specific implementations and scope of application based on the conception of the present disclosure. In conclusion, the content of this specification should not be construed as a limitation to the present disclosure.

What is claimed is:

1. A sit-up motion information management system based on an Internet of things (IoT), comprising:
   a main control chip;
   a laser distance sensor;
   a tilt sensor; and
   a gesture recognition sensor; wherein:
   the main control chip is respectively connected to the laser distance sensor, the tilt sensor and the gesture recognition sensor; and
   the laser distance sensor, the tilt sensor and the gesture recognition sensor are configured to be arranged on a thigh; the laser distance sensor is configured to detect a distance from the thigh to a trunk and send the distance to the main control chip; the tilt sensor is configured to detect an angle of the thigh from a horizontal ground and send the angle to the main control chip; the gesture recognition sensor is configured to detect an interference action of a hand and send the interference action to the main control chip; the main control chip is configured to determine present sit-up motion information according to the distance, the tilt angle and the interference action; and the present sit-up motion information comprises a number of sit-ups and whether a sit-up action is standard.

2. The sit-up motion information management system based on an IoT according to claim 1, further comprising: a server, wherein
   the server is connected to the main control chip; the server is configured to store preset sit-up motion information and receive the present sit-up motion information from the main control chip; and the main control chip is configured to compare the preset sit-up motion information with the present sit-up motion information and determine whether the present sit-up motion information is the same as the preset sit-up motion information.

3. The sit-up motion information management system based on an IoT according to claim 2, further comprising: a voice module, wherein
   the voice module is connected to the main control chip; and the voice module is configured to broadcast the present sit-up motion information determined by the main control chip.

4. The sit-up motion information management system based on an IoT according to claim 2, further comprising: a terminal, wherein
   the terminal is connected to the server; the terminal is configured to send the preset sit-up motion information to the server; and the terminal is further configured to receive the present sit-up motion information from the server.

5. A sit-up detection method based on an Internet of things (IoT), applied to the sit-up motion information management system based on an IoT according to claim 1, and the method comprising:
   acquiring detection data of the sensors at a present time, the detection data of the sensors at the present time comprising: a distance from a thigh to a trunk at the present time, an angle of the thigh from a horizontal ground at the present time and an interference action of a hand at the present time;
   determining whether the detection data of the sensor at the present time meet a first counting condition to obtain a first determination result, wherein the counting condition comprises that a distance from the thigh to the trunk at the present time is a first preset distance, an angle of the thigh from the horizontal ground at the present time is a first preset angle and an interference action of the hand at the present time is a first interference action;
   determining, if the first determination result indicates yes, that a sit-up action is correct, and incrementing a flag value by one;
   returning to the step of "acquiring detection data of the sensors at a present time" if the first determination result indicates no;
   acquiring detection data of the sensors at a next time, the detection data of the sensors at the next time comprising: a distance from the thigh to the trunk at the next time, an angle of the thigh from the horizontal ground at the next time and an interference action of the hand at the next time;
   determining whether the detection data of the sensor at the next time meet a second counting condition to obtain a second determination result, wherein the counting condition comprises that a distance from the thigh to the trunk at the next time is a second preset distance, an angle of the thigh from the horizontal ground at the next time is the first preset angle and an interference action of the hand at the next time is the first interference action;

determining, if the second determination result indicates yes, that a sit-up action is correct, and incrementing a flag value by one;

returning to the step of "acquiring detection data of the sensors at a next time" if the second determination result indicates no;

determining whether a flag value is greater than or equal to a preset value to obtain a third determination result; and determining, if the third determination result indicates yes, that one rep of sit-up actions is completed, and recording a number of sit-up reps.

6. The sit-up detection method based on an IoT according to claim 5, after the determining, if the third determination result indicates yes, that one rep of sit-up actions is completed, and recording a number of sit-up reps, further comprising:

determining whether the number of sit-up reps reaches a preset number of reps to obtain a fourth determination result;

determining, if the fourth determination result indicates yes, that one set of sit-up motions is completed; and returning to the step of "acquiring detection data of a sensor at present time" if the fourth determination result indicates no.

7. The sit-up detection method based on an IoT according to claim 5, after the determining, if the third determination result indicates yes, that one rep of sit-up actions is completed, and recording a number of sit-up reps, further comprising:

sending the number of sit-up reps to a terminal.

8. The sit-up detection method based on an IoT according to claim 5, after the determining, if the third determination result indicates yes, that one rep of sit-up actions is completed, and recording a number of sit-up reps, further comprising:

sending the number of sit-up reps to a voice module.

9. The sit-up detection method based on an IoT according to claim 5, after the acquiring detection data of the sensors at a present time, further comprising:

determining whether the detection data of the sensors at the present time meet a start condition to obtain a fifth determination result, wherein the start condition comprises that a distance from the thigh to the trunk at the present time is a third preset distance, an angle of the thigh from the horizontal ground at the present time is the first preset angle and an interference action of the hand at the present time is the first interference action;

determining, if the fifth determination result indicates yes, whether the detection data of the sensors at the present time meet the first counting condition; and returning to the step of "acquiring detection data of the sensors at a present time" if the fifth determination result indicates no.

10. The sit-up detection method based on an IoT according to claim 5, wherein the server is connected to the main control chip; the server is configured to store preset sit-up motion information and receive the present sit-up motion information from the main control chip; and the main control chip is configured to compare the preset sit-up motion information with the present sit-up motion information and determine whether the present sit-up motion information is the same as the preset sit-up motion information.

11. The sit-up detection method based on an IoT according to claim 10, further comprising: a voice module, wherein the voice module is connected to the main control chip; and the voice module is configured to broadcast the present sit-up motion information determined by the main control chip.

12. The sit-up detection method based on an IoT according to claim 11, after the determining, if the third determination result indicates yes, that one rep of sit-up actions is completed, and recording a number of sit-up reps, further comprising:

determining whether the number of sit-up reps reaches a preset number of reps to obtain a fourth determination result;

determining, if the fourth determination result indicates yes, that one set of sit-up motions is completed; and returning to the step of "acquiring detection data of the sensors at a present time" if the fourth determination result indicates no.

13. The sit-up detection method based on an IoT according to claim 11, after the determining, if the third determination result indicates yes, that one rep of sit-up actions is completed, and recording a number of sit-up reps, further comprising:

sending the number of sit-up reps to a terminal.

14. The sit-up detection method based on an IoT according to claim 11, after the determining, if the third determination result indicates yes, that one rep of sit-up actions is completed, and recording a number of sit-up reps, further comprising:

sending the number of sit-up reps to a voice module.

15. The sit-up detection method based on an IoT according to claim 10, further comprising: a terminal, wherein the terminal is connected to the server; the terminal is configured to send the preset sit-up motion information to the server; and the terminal is further configured to receive the present sit-up motion information from the server.

16. The sit-up detection method based on an IoT according to claim 15, after the determining, if the third determination result indicates yes, that one rep of sit-up actions is completed, and recording a number of sit-up reps, further comprising:

determining whether the number of sit-up reps reaches a preset number of reps to obtain a fourth determination result;

determining, if the fourth determination result indicates yes, that one set of sit-up motions is completed; and returning to the step of "acquiring detection data of the sensors at a present time" if the fourth determination result indicates no.

17. The sit-up detection method based on an IoT according to claim 15, after the determining, if the third determination result indicates yes, that one rep of sit-up actions is completed, and recording a number of sit-up reps, further comprising:

sending the number of sit-up reps to a terminal.

18. The sit-up detection method based on an IoT according to claim 10, after the determining, if the third determination result indicates yes, that one rep of sit-up actions is completed, and recording a number of sit-up reps, further comprising:

determining whether the number of sit-up reps reaches a preset number of reps to obtain a fourth determination result;

determining, if the fourth determination result indicates yes, that one set of sit-up motions is completed; and returning to the step of "acquiring detection data of the sensors at a present time" if the fourth determination result indicates no.

19. The sit-up detection method based on an IoT according to claim 10, after the determining, if the third determination result indicates yes, that one rep of sit-up actions is completed, and recording a number of sit-up reps, further comprising:

sending the number of sit-up reps to a terminal.

20. The sit-up detection method based on an IoT according to claim 10, after the determining, if the third determination result indicates yes, that one rep of sit-up actions is completed, and recording a number of sit-up reps, further comprising:

sending the number of sit-up reps to a voice module.

\* \* \* \* \*